March 12, 1940.  F. BIELITZ  2,193,120
CONNECTING ROD FOR ENGINES
Filed April 15, 1939
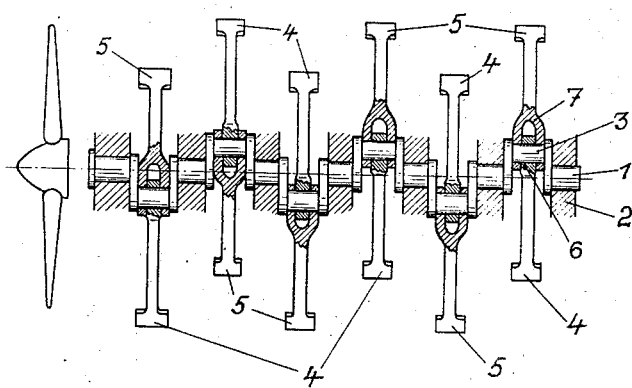
Friedrich Bielitz
INVENTOR
By: John A. Kehlenbeck
Atty.

Patented Mar. 12, 1940

2,193,120

UNITED STATES PATENT OFFICE 2,193,120

CONNECTING ROD FOR ENGINES

Friedrich Bielitz, Dessau-Ziebigk, Germany, assignor to Junkers Flugzeug-und-Motorenwerke A. G., Dessau, Germany, a corporation of Germany Application April 15, 1939, Serial No. 268,054
In Germany April 14, 1938

3 Claims. (Cl. 74—596)

In internal combustion engines having their cylinders arranged in two or more rows it has been customary to transmit the power exerted by the working strokes of opposite cylinders (those located between the same transverse planes) to the same crank pin of the crank shaft. For this purpose, connecting rods of two kinds have been used in connection with the respective pistons, namely so-called main and auxiliary connecting rods. Of these, each main connecting rod was provided, at its end distant from the piston, with a bearing portion to engage the respective crank pin, while the auxiliary connecting rod was linked to the respective main connecting rod and thus transmitted the power of the piston associated with such auxiliary connecting rod, to the crank pin through the intermediary of the bearing portion of said main connecting rod. In many cases each of the main and the auxiliary connecting rods was provided, at its end distant from the respective piston, with a bearing portion for engaging the respective crank pin, and each crank pin was engaged by the bearing portion of a main connecting rod, and also by that of an auxiliary connecting rod, these bearing portions being so formed that one of them was forked to embrace the other.

Assuming equal weights for the several pistons and their associated connecting rods, an equalization or balancing of the masses can be obtained, at least approximately, by an appropriate staggering of the cranks.

Special difficulties, however, are met in the case of engines having their cylinders arranged in a plurality of rows, in that for reasons of practical construction it is generally impossible in this case to have a like mass distribution for the auxiliary connecting rod and for the main connecting rod, which latter as explained above either engages the crank pin directly or is provided with a forked bearing portion. During the operation of the engine, the unbalanced mass forces resulting from the unbalanced construction will produce rotary oscillations of different amplitudes which increase as the distance from the oscillation node increases. When the construction uses auxiliary connecting rods linked to the main connecting rods, there is the further drawback that the effect of the working strokes of the pistons is transmitted differently by the main connecting rods and by the auxiliary connecting rods, thus tending to produce rotary oscillations of the same character as those produced by the unbalanced mass forces referred to above.

The phenomena explained above have not been taken into account hitherto, and in practice the main connecting rods have been associated with the cylinders of one row, and the auxiliary connecting rods with the cylinders of the other row. Experience, particularly with recent high-power internal combustion engines, has shown that the rotary oscillations due to the unbalanced mass distribution of the several connecting rods become objectionably strong and may cause unsatisfactory and impermissible operation of an engine.

The object of my present invention is to provide an improved arrangement for the connecting rods of an internal combustion engine having its cylinders in a plurality of rows. This improved arrangement eliminates, or at least largely reduces, the production of objectionably strong rotary oscillations due to unbalanced mass distribution and to uneven transmission of the power strokes. According to my invention, this result is obtained by a novel arrangement or association of the connecting rods with the several cylinders. The connecting rods, which differ with respect to their mass effect and in some cases also with respect to the power transmission effect, are associated with the cylinders of the two or more rows in such a manner as to bring to a minimum value the geometric sum of the amplitudes of the rotary oscillations that may arise owing to differences in the mass effects of the several connecting rods.

The accompanying drawing shows, with parts in section, the crank shaft and the connecting rods of a twelve-cylinder internal combustion engine the cylinders of which are disposed in two rows, as an example of an improved arrangement embodying my invention.

In the drawing, I designates the crank shaft of the twelve-cylinder engine, such shaft being journalled in bearings 2. The crank pins 3 are engaged by the auxiliary connecting rods 4 having bearing portions 6, which are embraced by the forked bearing portions 7 of the main connecting rods 5, said forked portions likewise engaging the respective cranks of the shaft 1.

The connecting rods are associated with the pistons of cylinders of the same row in an irregular order. That is, in this example of a twelve-cylinder engine with two rows of cylinders, one set of connecting rods 5 are associated with the first, fourth, and sixth cylinders of one row and with the second, third, and fifth cylinders of the other row. The auxiliary connecting rods 4 are associated with the other cylinders of the two rows.

I claim:

1. In an internal combustion engine having a plurality of rows of cylinders, pistons in said cylinders, a common crankshaft, and two kinds of connecting rods joining pairs of pistons, each of which lies in a different row, to the same bearing upon said shaft, and producing different mass forces, respectively, thereon, the improvement comprising disposing both kinds of said rods in irregular sequence on each side of said crankshaft whereby the geometrical sum of the amplitudes of the rotary oscillation impulses produced by the different mass forces is minimized.

2. In an internal combustion engine having two rows of at least six cylinders each, pistons in said cylinders, a common crankshaft, and two kinds of connecting rods joining pairs of pistons, each of which lies in a different row, to the same bearing upon said shaft, and producing different mass forces, respectively, thereon, the improvement comprising disposing both kinds of said rods upon both sides of said crankshaft, the connecting rods of one kind being associated with the first, fourth, sixth, and any other higher even numbered cylinders of one row, and being associated with the second, third, fifth, and any higher odd numbered cylinders of the other row, and the rods of the other kind being associated with the remaining cylinders.

3. In an internal combustion engine having two rows of at least four cylinders each, pistons in said cylinders, a common crankshaft, and two kinds of connecting rods joining pairs of pistons, each of which lies in a different row, to the same bearing upon said shaft, and producing different mass forces, respectively, thereon, the improvement comprising disposing both kinds of said rods upon both sides of said crankshaft, the connecting rods of one kind being associated with the first, fourth, and any other higher even numbered cylinders of one row, and being associated with the second, third, and any higher odd numbered cylinders of the other row, and the rods of the other kind being associated with the remaining cylinders.

FRIEDRICH BIELITZ.